(12) United States Patent
Nakashima (10) Patent No.: US 7,885,806 B2
(45) Date of Patent: Feb. 8, 2011

(54) SIMULATION METHOD AND SIMULATION SYSTEM OF INSTRUCTION SCHEDULING

(75) Inventor: Hiroshi Nakashima, Toyohashi (JP)

(73) Assignee: Semiconductor Technology Academic Research Center, Yokohama-shi (JP)

(*) Notice: Subject to any disclaimer, the term of this patent is extended or adjusted under 35 U.S.C. 154(b) by 724 days.

(21) Appl. No.: 10/405,944

(22) Filed: Mar. 31, 2003

(65) Prior Publication Data

US 2004/0034852 A1 Feb. 19, 2004

(30) Foreign Application Priority Data

Aug. 19, 2002 (JP) .............................. 2002-238396

(51) Int. Cl.
*G06F 9/455* (2006.01)
(52) U.S. Cl. ....................................................... 703/26
(58) Field of Classification Search .................... 703/8, 703/26; 717/136–161
See application file for complete search history.

(56) References Cited

U.S. PATENT DOCUMENTS 5,301,336 A * 4/1994 Kodosky et al. ............ 715/846

FOREIGN PATENT DOCUMENTS

| JP | 58-103047 A | 6/1983 |
|----|-------------|--------|
| JP | 63-95538 A | 4/1988 |
| JP | 7-295832 A | 11/1995 |
| JP | 8-69392 A | 3/1996 |
| JP | 2000-20349 A | 1/2000 |

OTHER PUBLICATIONS

Translation of Detailed Description of Japanese Patent Publication 08-069392. 1996.*
Stoodely, Mark G. and Corinna G. Lee. "Software Pipelining Loops with Conditional Branches." 1996 IEEE.*
An English translation of an Examiner's Action in the foreign counterpart, Japanese Patent Application No. 2002-238396.
Burger, D., and T.M. Austin, "The SimpleScalar Tool Set, Version 2.0," *University of Wisconsin-Madison Computer Sciences Department Technical Report* #1342, Jun. 1997, pp. 1-21.
Schnarr, E.C., et al., "Facile: A Language and Compiler For High-Performance Processor Simulators[1]," *Proc. ACM SIGPLAN Conference on Programming Language Design and Implementation*, Jun. 2001, pp. 321-331.
Schnarr, E. and Larus, J.R., "Fast Out-Of-Order Processor Simulation Using Memoization," *Eight International Conference on Architectural Support for Programming Languages and Operating Systems (ASPLOS-VIII)*, Oct. 1998, pp. 283-294.

* cited by examiner

*Primary Examiner*—Hugh Jones
(74) *Attorney, Agent, or Firm*—Christensen O'Connor Johnson Kindness PLLC (57) ABSTRACT

There is provided a simulation method of instruction scheduling comprising detecting a loop from an instruction sequence to be simulated, registering an instruction scheduling target instruction sequence in a loop detection state, comparing a current scheduling target instruction sequence with the registered scheduling target instruction sequence for each loop cycle, and skipping, when the current scheduling target instruction sequence matches the registered scheduling target instruction sequence, scheduling of that scheduling target instruction sequence, and newly registering, when the two instruction sequences do not match, the current scheduling target instruction sequence and executing scheduling.

8 Claims, 10 Drawing Sheets

SIMULATION METHOD AND SIMULATION SYSTEM OF INSTRUCTION SCHEDULING

CROSS-REFERENCE TO RELATED APPLICATIONS

This application is based upon and claims the benefit of priority from the prior Japanese Patent Application No. 2002-238396, filed on Aug. 19, 2002, the entire contents of which are incorporated herein by reference.

BACKGROUND OF THE INVENTION

1. Field of the Invention

The present invention relates to simulation of a program of a processor and, more particularly, to a simulation method and simulation system of instruction scheduling.

2. Description of the Related Art

Upon developing an information processing system such as an SOC (System On Chip) including a high-speed processor, performance evaluation and operation inspection of the entire system including software must often be done before completion of the SOC as a target of development in some development processes. In order to attain accurate performance evaluation and operation inspection, simulation using a simulator, which is accurate in machine cycles and is called a CA (Cycle Accurate) simulator, is required. Upon execution of CAS (Cycle Accurate Simulation) using such CA simulator, i.e., upon execution of CA simulation, if a processor (e.g., a CPU) of the SOC as a target of performance evaluation and operation inspection is of a high-speed, high-performance one, an execution time about 5000 to 10,000 times of an actual operation time of this CPU after it is mounted is required.

In general, the CA simulator comprises an instruction emulator and instruction scheduler. The instruction emulator fetches and executes instructions of developed software, and the instructions executed by the instruction emulator are sent to the instruction scheduler. The instruction scheduler schedules the instructions sent from the instruction emulator. In this way, instructions, which are fetched and executed by the instruction emulator, are sent in turn to the instruction scheduler, which sequentially schedules instructions.

The CAS must accurately simulate, e.g., the behavior of a CPU (especially, an instruction scheduling process) in each machine cycle inside a simulator of the SOC. In order to implement accurate simulation, this scheduling process is necessary and indispensable. In the above arrangement of the CA simulator, the calculation time of the instruction emulator is around 1% of the total processing time in the CAS, but the calculation time of the instruction scheduler that sequentially executes scheduling accounts for most of the CAS.

For this reason, in the conventional technique, the execution time of instruction scheduling in the CAS becomes a bottleneck, and it is difficult to attain high-speed, accurate performance evaluation and operation inspection of the entire system.

BRIEF SUMMARY OF THE INVENTION

A simulation method of instruction scheduling according to an aspect of the present invention comprising: detecting a loop from an instruction sequence to be simulated; registering an instruction scheduling target instruction sequence in a loop detection state; comparing a current scheduling target instruction sequence with the registered scheduling target instruction sequence for each loop cycle; and skipping, when the current scheduling target instruction sequence matches the registered scheduling target instruction sequence, scheduling of that scheduling target instruction sequence, and newly registering, when the two instruction sequences do not match, the current scheduling target instruction sequence and executing scheduling.

A simulation system of instruction scheduling according to another aspect of the present invention comprises: a loop detection circuit configured to detect a loop from an instruction sequence to be simulated; a registration circuit configured to register an instruction scheduling target instruction sequence in a state in which the loop is detected by the loop detection circuit; and a comparison circuit configured to compare a current scheduling target instruction sequence with the registered scheduling target instruction sequence for each loop cycle, wherein, when the current scheduling target instruction sequence matches the registered scheduling target instruction sequence, scheduling of that scheduling target instruction sequence is skipped, and when the two instruction sequences do not match, the current scheduling target instruction sequence is newly registered and scheduling is executed.

A simulation system of instruction scheduling according to still another aspect of the present invention comprises: an instruction emulator which executes a fetched instruction sequence and records execution logs; an instruction scheduler which executes instruction scheduling on the basis of the execution logs recorded in the instruction emulator, and detects a loop included in the instruction sequence; and a calculation re-use engine in which an instruction sequence held by the instruction scheduler while the loop is detected is registered, and the instruction scheduler has a circuit configured to compare an instruction sequence registered in the calculation re-use engine with a current instruction scheduling target instruction sequence for each loop cycle, to skip scheduling, when the two instruction sequences match, to newly register, when the two instruction sequences do not match, the current instruction sequence in the calculation re-use engine, and to execute instruction scheduling.

DETAILED DESCRIPTION OF THE INVENTION

An embodiment of the present invention will be described hereinafter with reference to the accompanying drawings. This embodiment will exemplify an SOC as a target of performance evaluation and operation inspection. However, the present invention is not limited to such specific target, and can be applied to a general processor (especially, a high-speed processor).

Figure 1:
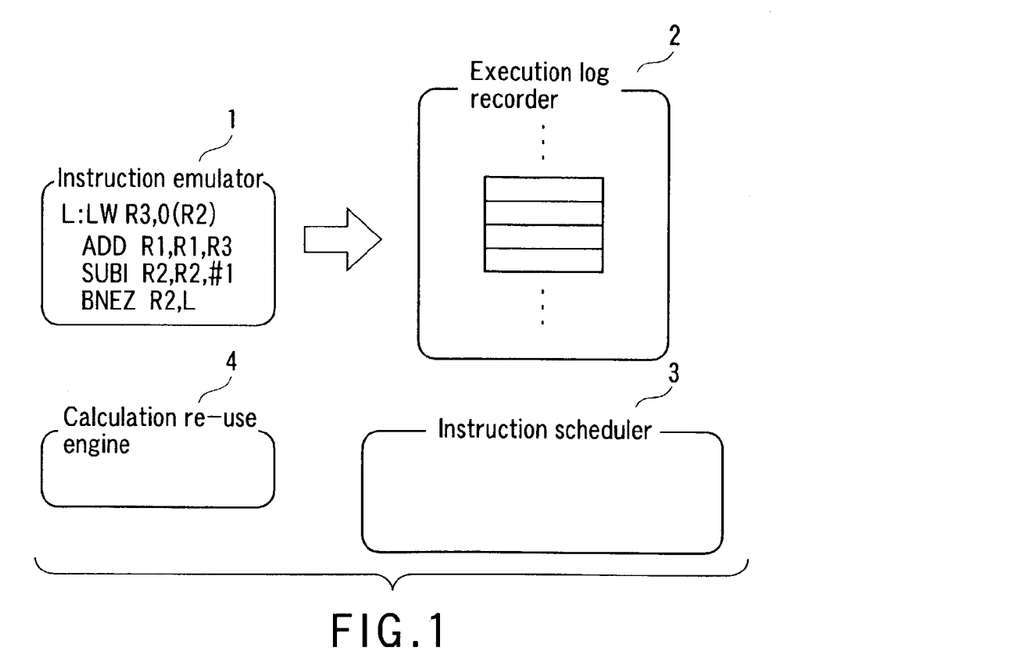
FIG. 1 is a functional block diagram of a simulation system of instruction scheduling according to an embodiment of the present invention.

FIG. 1 is a functional block diagram showing a CA simulator of this embodiment used to implement performance evaluation and operation inspection of an SOC. This CA simulator separately comprises an instruction emulator 1, an execution log recorder 2 which is attached to this instruction emulator 1, an instruction scheduler 3, and a calculation re-use engine 4. In this embodiment, the execution log recorder 2 is arranged in the instruction emulator 1, but may be arranged outside the instruction emulator 1 or may be attached to the instruction scheduler 3. That is, the location of the execution log recorder 2 in the CA emulator is not particularly limited. In FIG. 1, the execution log recorder 2 is illustrated outside the instruction emulator 1 for the sake of simplicity.

Referring to FIG. 1, an instruction sequence of a target program, which is to undergo performance evaluation or operation inspection, is sequentially sent from a main storage (not shown) that stores the target program to the instruction emulator 1 instruction by instruction. In this way, the instruction emulator 1 sequentially fetches instructions from the main storage. Also, the instruction emulator 1 has a function of executing the fetched instruction precedently.

The execution results of the instructions which have been executed precedently are sequentially sent to the execution log recorder 2. Since this execution log is a record of the actual execution result of an instruction sequence, accurate results of all instructions as well as branch instructions and the like are recorded. In this embodiment, the execution log recorder 2 has a capacity that can record execution results of instructions executed by the instruction emulator 1 for a given quantity (e.g., for 10,000 instructions).

Note that the execution result of the instruction sequence is information which is obtained by executing instructions and is necessary and sufficient for instruction scheduling later, and includes the addresses of executed instructions, instructions themselves, success/failure of branch, success/failure of branch prediction, cache hit/mishit, presence/absence of exception, and the like. Especially, the instruction emulator 1 logically executes instructions including arithmetic operation before scheduling (to be described later) so as to find a loop calculation to be made in a loop part of instructions, which has a backward branch instruction as a start point in a simulation target program.

The execution log recorded by the execution log recorder 2 is sent to the instruction scheduler 3 for, e.g., two instructions for each cycle. Note that the execution log recorder 2 sends two instructions for each cycle to the instruction scheduler 3. However, the number of instructions to be sent is not limited to two, but one instruction may be sent or three or more instructions may be sent together for each cycle.

The instruction scheduler 3 periodically schedules instructions on the basis of the execution log sent from the execution log recorder 2. This instruction scheduler 3 has a function of detecting a loop included in an instruction sequence from the execution results recorded in the execution log, in addition to normal instruction scheduling. Upon detection of a loop of the instruction sequence, the instruction scheduler 3 inquires of the calculation re-use engine 4 whether or not an identical scheduling target instruction sequence has already been registered, for each loop, i.e., every time the execution log includes two successive backward branch instructions, whose branch addresses and branch destination addresses indicate the two end positions of the loop and match. If no identical scheduling target instruction sequence is registered, a snapshot of pipeline stages in the instruction scheduler 3, i.e., an instruction sequence held by the instruction scheduler 3 at that time as a scheduling target, is registered in the calculation re-use engine 4. In this way, if the execution log as the execution result of the instruction sequence includes a loop, the scheduling target instruction sequence is sent to the calculation re-use engine 4.

Note that the instruction scheduler 3 comprises, e.g., three pipeline stages. The first stage (the leftmost column shown in FIGS. 2 to 11) fetches and decodes instructions. The second stage (the central column shown in FIGS. 2 to 11) makes so-called arithmetic operations, i.e., it fetches data designated by a load instruction LW from the main storage, makes arithmetic operations based on an add instruction ADD and subtract instruction SUBI, checks a condition in a branch instruction BNEZ, and so forth. The third stage (the rightmost column shown in FIGS. 2 to 11) stores the arithmetic operation results in registers and the like. In this embodiment, three pipeline stages are formed in the instruction scheduler 3 in this way. However, the instruction scheduler 3 need not always comprise three pipeline stages, but may comprise, e.g., four pipeline stages.

The calculation re-use engine 4 records an instruction sequence to be scheduled by the instruction scheduler 3 upon detection of a loop as needed, as will be described later. If an instruction sequence, which is the same as the contents of the instruction scheduler 3, is not registered in the calculation re-use engine 4 upon detection of a loop, that instruction sequence is registered, and instruction scheduling is executed to register its scheduling result. If the instruction sequence has already been registered, an instruction scheduling process is skipped using the result stored in the calculation re-use engine 4. This skip operation is similarly performed in the subsequent scheduling arithmetic operations as long as a loop continues, and is repeated until the end of the loop is detected. That is, as long as a loop continues, the instruction sequence included in that loop is scheduled at least once at the beginning of the loop, and the scheduling result is registered. In the second and subsequent cycles of the loop, subsequent processes are executed without any scheduling using the scheduling result stored in the calculation re-use engine 4.

In this manner, an identical instruction sequence in a loop can be prevented from being repetitively scheduled, and the time required for scheduling arithmetic operations can be greatly reduced. In the following description, the skip operation of instruction scheduling after loop detection is done in a high-speed execution mode.

An outline of the CA simulator of this embodiment has been explained. An instruction processing sequence that can achieve high-speed scheduling of the instruction scheduler 3 in this embodiment will be described in detail hereinafter with reference to the functional block diagram shown in FIGS. 1 to 11, and the flow charts shown in FIGS. 12 to 18.

A program to be executed by the SOC as a target of CA simulation is an instruction sequence which consists of segments of a machine instruction program such as a load instruction LW, add instruction ADD, subtract instruction SUBI, branch instruction BNEZ that defines the start point of a loop, and the like, which are described in the emulator 1 shown in FIG. 1. By simulating such instruction sequence by the CA simulator, performance evaluation or operation inspection of the system including the SOC can be made.

Figure 11:
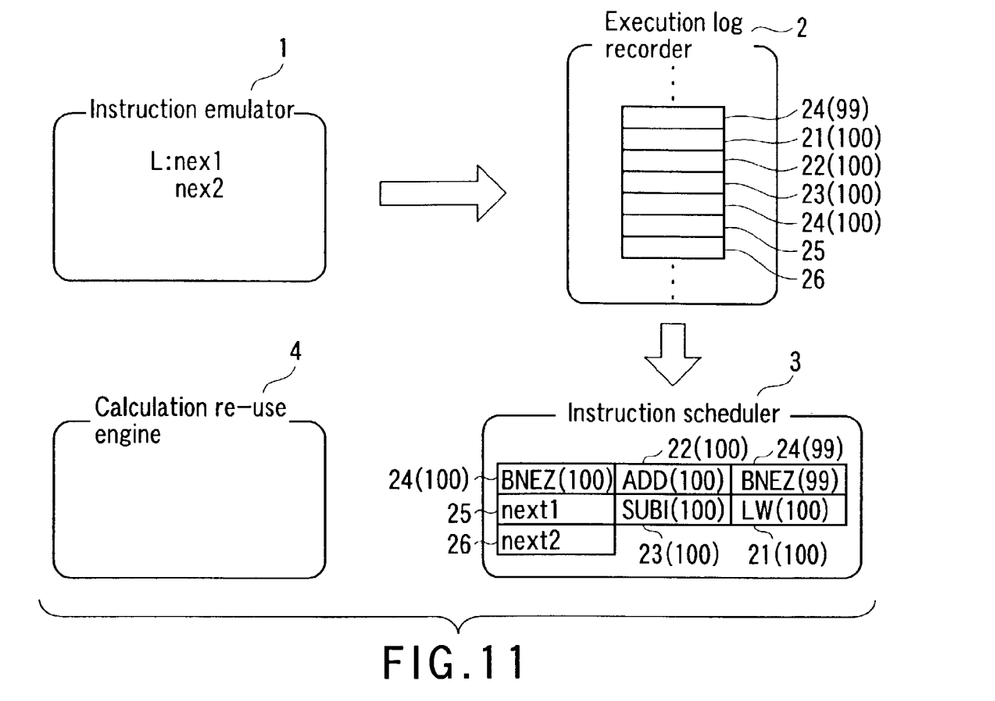
FIG. 11 is a functional block diagram showing a state wherein two new instructions are further sent to the instruction scheduler after FIG. 10.
Figure 12:
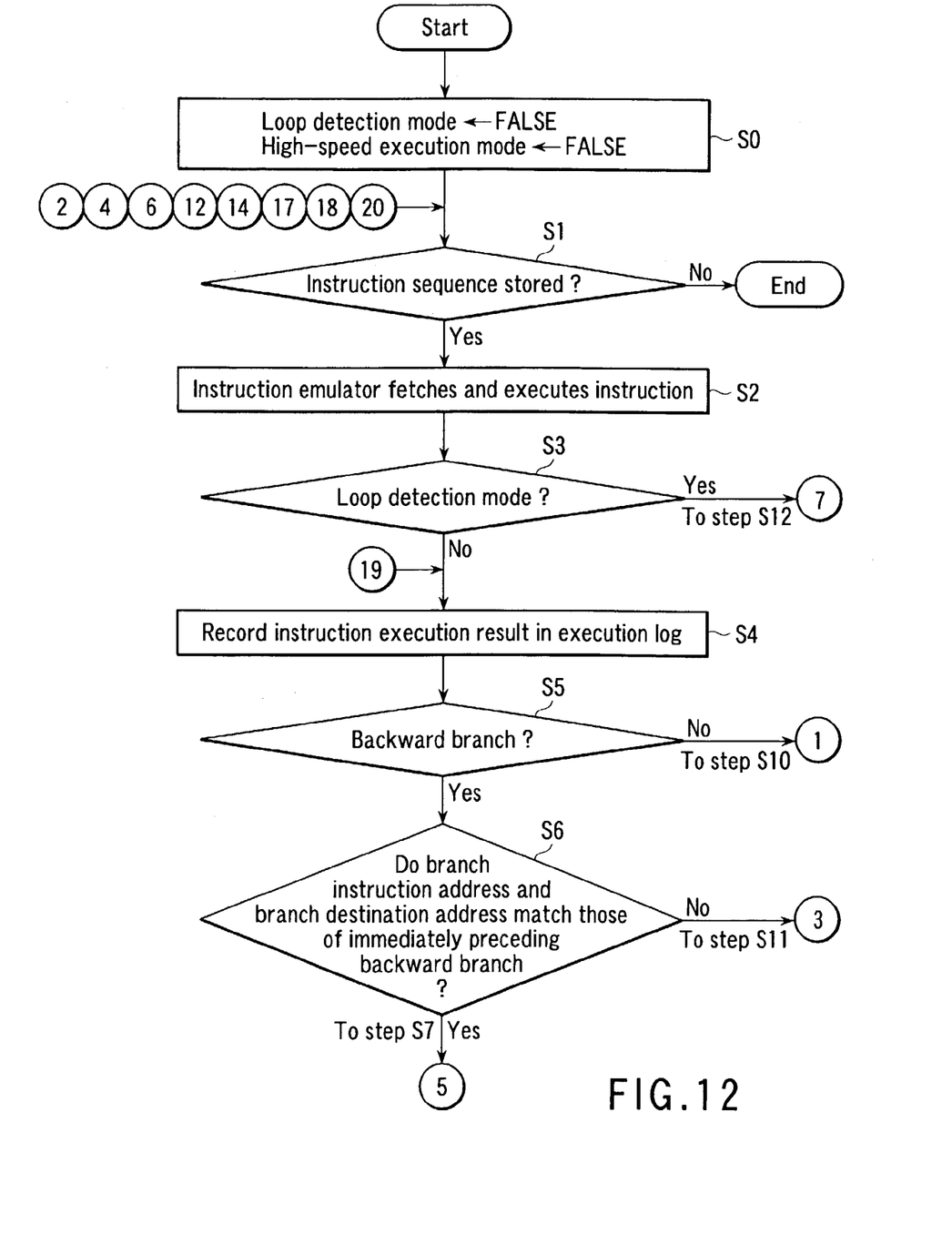
FIG. 12 is a flow chart showing first part in the operation flow of the simulation system according to an embodiment of the present invention.
Figure 13:
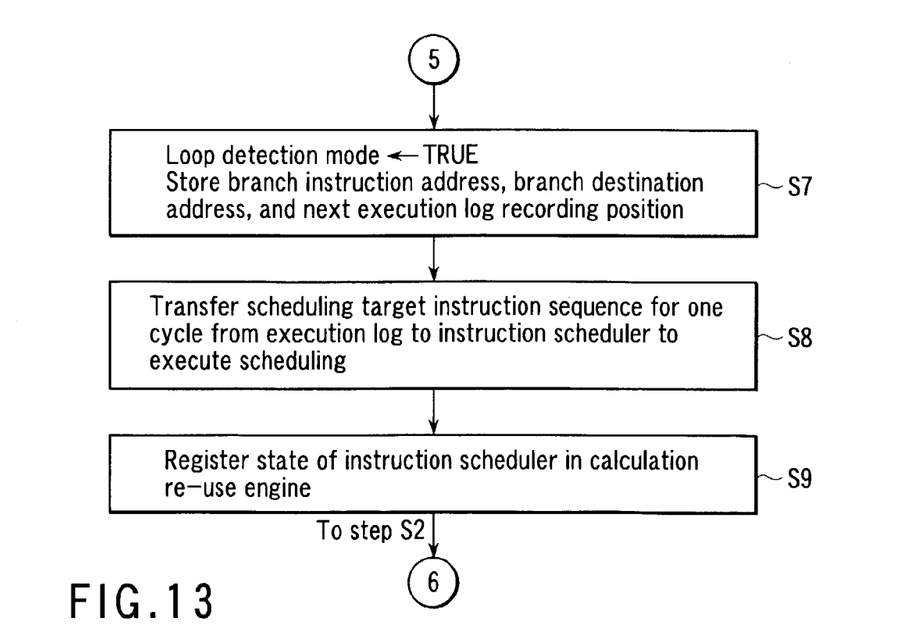
FIG. 13 is a flow chart showing the part that follows FIG. 12 in the operation flow of the simulation system according to the embodiment of the present invention.
Figure 14:
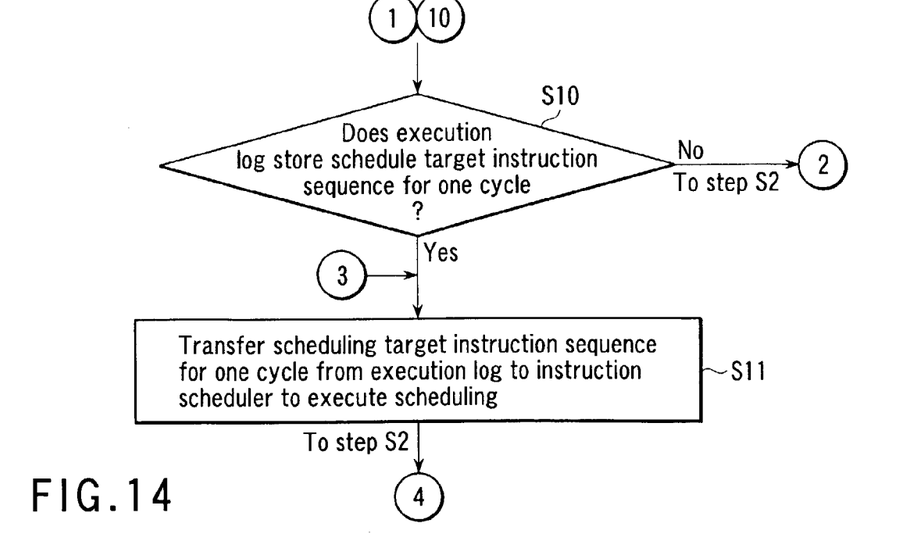
FIG. 14 is a flow chart showing the part that follows FIGS. 12 and 16 in the operation flow of the simulation system according to the embodiment of the present invention.
Figure 15:
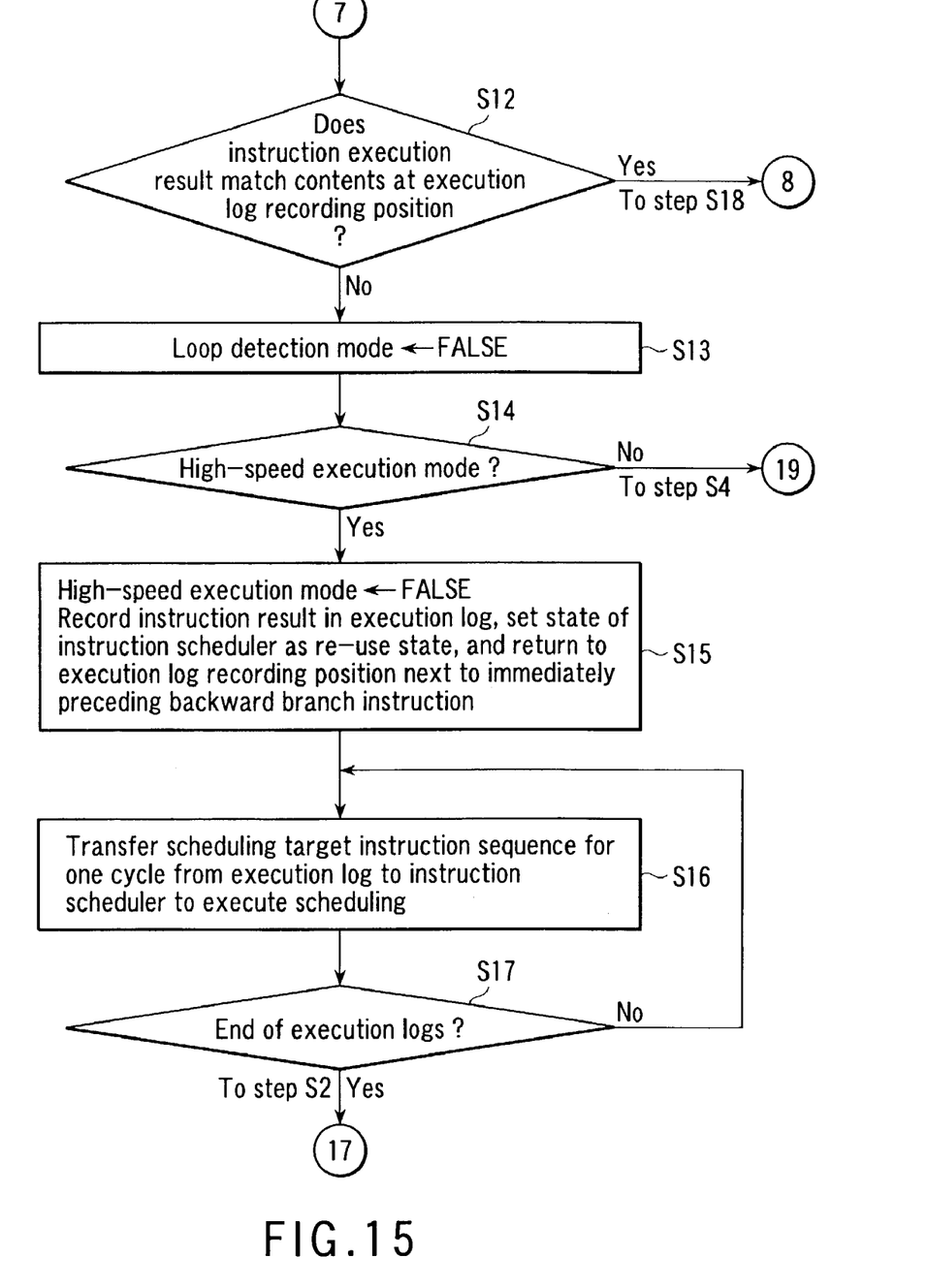
FIG. 15 is a flow chart showing the part that follows FIG. 12 in the operation flow of the simulation system according to the embodiment of the present invention.
Figure 16:
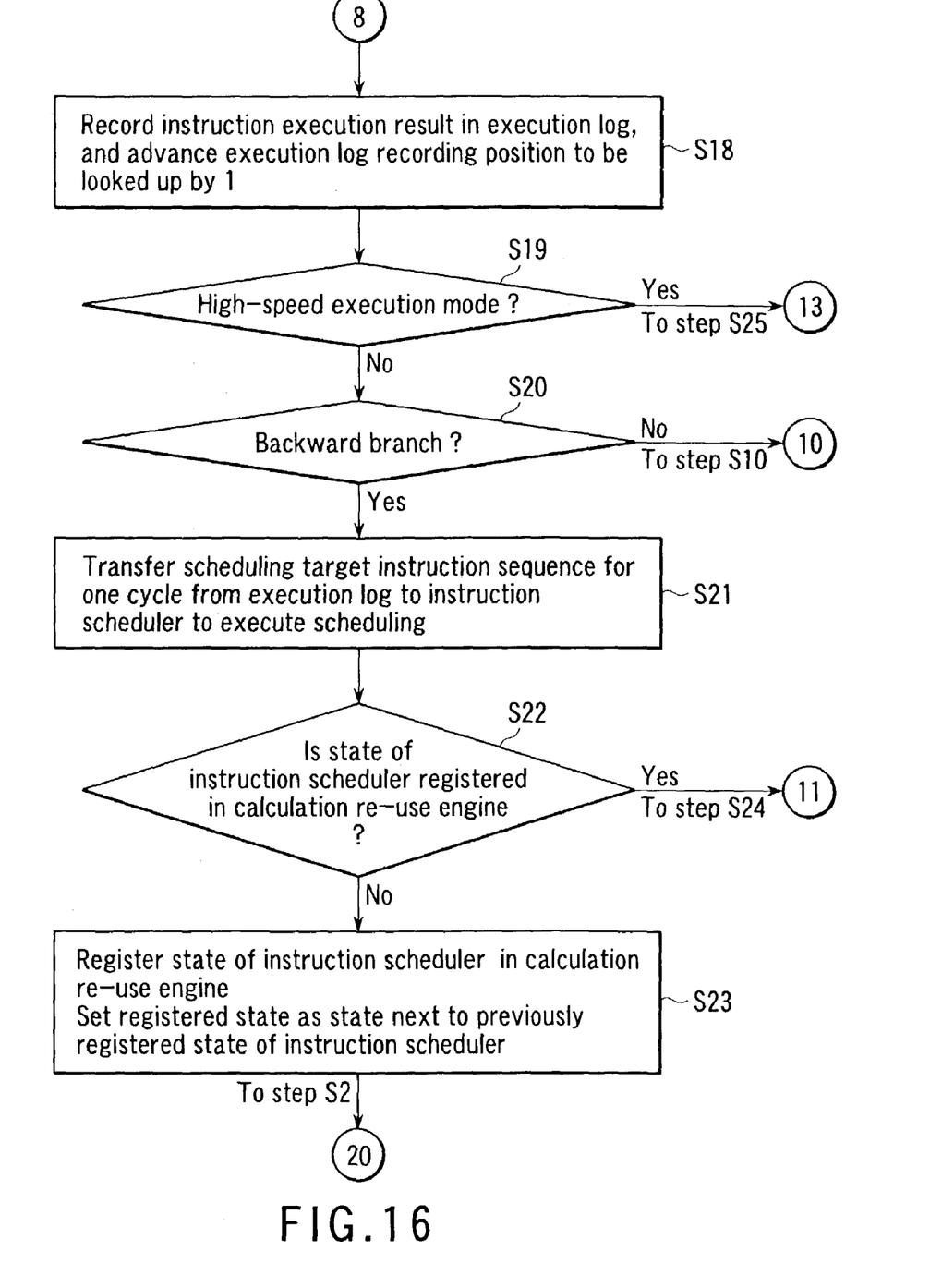
FIG. 16 is a flow chart showing the part that follows FIG. 15 in the operation flow of the simulation system according to the embodiment of the present invention.
Figure 17:
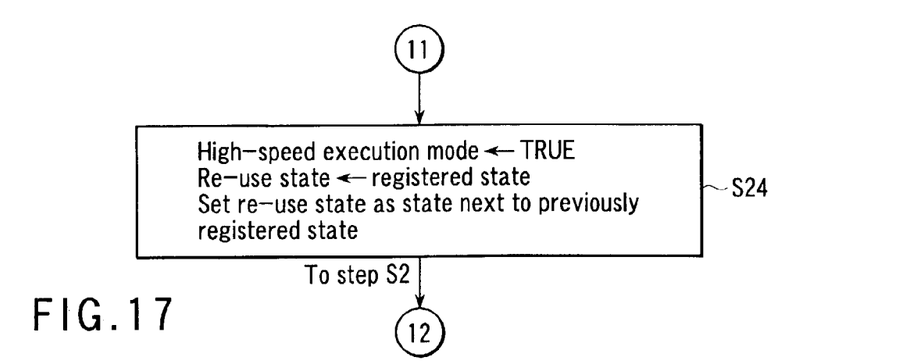
FIG. 17 is a flow chart showing the part that follows FIG. 16 in the operation flow of the simulation system according to the embodiment of the present invention.
Figure 18:
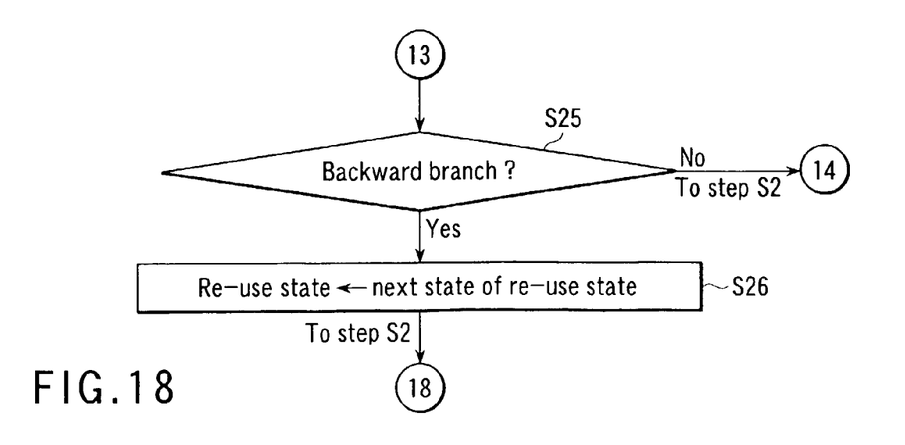
FIG. 18 is a flow chart showing the part that follows FIG. 16 in the operation flow of the simulation system according to the embodiment of the present invention.

In step S0 in FIG. 11, since neither a loop instruction sequence is detected nor a high-speed execution mode is set, a loop detection mode is set to be FALSE of a logical value, and the high-speed execution mode is also set to be FALSE.

The flow advances to step S1. In step S1, the instruction emulator 1 in FIG. 2 accesses the main storage (not shown) to check if an instruction sequence of a CA simulation target program is stored in this main storage. If NO in step S1, i.e., if no target instruction sequence remains, the process ends. If YES in step S1, the flow advances to step S2.

Figure 2:
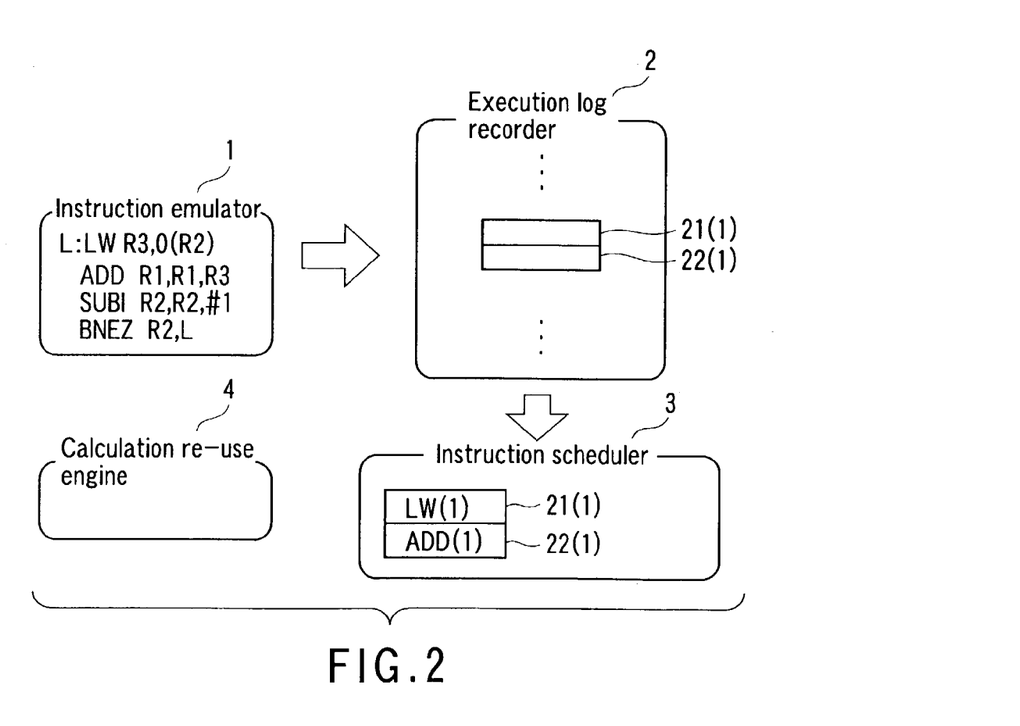
FIG. 2 is a functional block diagram showing a state wherein two new instructions are sent to an instruction scheduler in the functional block diagram of FIG. 1.

In step S2, the instruction sequence of the simulation target program is sent in turn from its head from the main storage to the instruction emulator 1 instruction by instruction. That is, the instruction emulator 1 fetches the instruction sequence from the main storage in step S2. The instruction emulator 1 precedently executes the received instruction. In FIG. 2, an instruction fetched first is a load instruction LW(1). However, in the instruction emulator 1 shown in FIGS. 2 to 9, a general expression "L:LW" is used.

Note that the meaning of the load instruction "L:LW R3,0 (R2)" shown as an example in FIG. 2 is to read out one word from the main storage using, as an address, a value obtained by adding zero to a value held by register No. 2 (R2: not shown), i.e., the value itself of register R2, and to store the readout word in register No. 3 (R3: not shown).

It is checked in step S3 if the loop detection mode is TRUE. In this case, since the loop detection mode is FALSE but not TRUE, the flow advances to step S4 to record an execution log 21(1) which includes the execution result of the precedently executed instruction LW(1) in the execution log recorder 2. Since this execution log is a record of the actual execution result of the instruction sequence, accurate results of all branch instructions and the like as well as instructions themselves are recorded. Note that the execution log recorder 2 is set to have a recording capacity of 10,000 execution logs in this embodiment.

Furthermore, the execution log 21(1), which is recorded in the execution log recorder 2, is transferred to the instruction scheduler 2 for the purpose of instruction scheduling. In this embodiment, the execution log recorder 2 sequentially sends execution logs for two instructions for each cycle to the instruction scheduler 3, and does not send any logs when the first instruction LW(1) has been fetched by the instruction emulator 1.

The flow advances to step S5 to check if the execution log 21(1) recorded in the execution log recorder 2 is a backward branch instruction. Since this load instruction LW(1) is not a backward branch instruction, the flow advances to step S10. It is checked in step S10 if a scheduling target instruction sequence for one cycle is stored in the execution log recorder 2. When the execution log 21(1) associated with the first instruction LW(1) is recorded in the recorder 2, a schedule target instruction sequence for one cycle is not stored yet. Therefore, the flow returns to step S2 without scheduling.

In this state, the instruction emulator 1 fetches the next add instruction ADD(1). The process associated with this fetched add instruction ADD(1) also advances to steps S3, S4, S5, and S10 as in the case of the load instruction LW(1).

Note that the meaning of add instruction "ADD R1,R1,R3" described as an example in the instruction emulator 1 in FIG. 2 is to store the sum of the values of registers R1 and R3 (not shown) in register R1.

In step S10, when an execution log 22(1) associated with this add instruction ADD(1) is recorded in the execution log recorder 2, as shown in FIG. 2, a scheduling target instruction sequence for one cycle is stored. For this reason, the flow advances to step S11, and the execution log recorder 2 sends the execution logs 21(1) and 22(1) of the load instruction LW(1) and add instruction ADD(1) which form the scheduling target instruction sequence for one cycle to the instruction scheduler 3, thus executing scheduling.

The instruction scheduler 3 shown in FIG. 2 shows the scheduling result of the execution logs 21(1) and 22(1) of the instructions LW(1) and ADD(1). When this scheduling is executed, the flow returns from step S11 to step S2.

In step S2, the instruction emulator 1 then fetches a new subtract instruction SUBI(1). In the instruction emulator 1 in FIG. 2, this subtract instruction SUBI is indicated by a general expression "SUBI". The process associated with this subtract instruction SUBI(1) similarly advances to steps S2, S3, S4, S5, and S10 in turn. In step S10, when an execution log 23(1) associated with the subtract instruction SUBI(1) is recorded in the execution log recorder 2, since a scheduling target instruction sequence for the next cycle is not stored in the execution log recorder 2 yet, the flow returns to step S2 without scheduling.

Note that the meaning of the subtract instruction "SUBI R2, R2, #1" described as an example in the instruction emulator 1 in FIG. 2 is to store the difference obtained by immediate value 1 (#1) from the value of register R2 in register R2.

Figure 3:
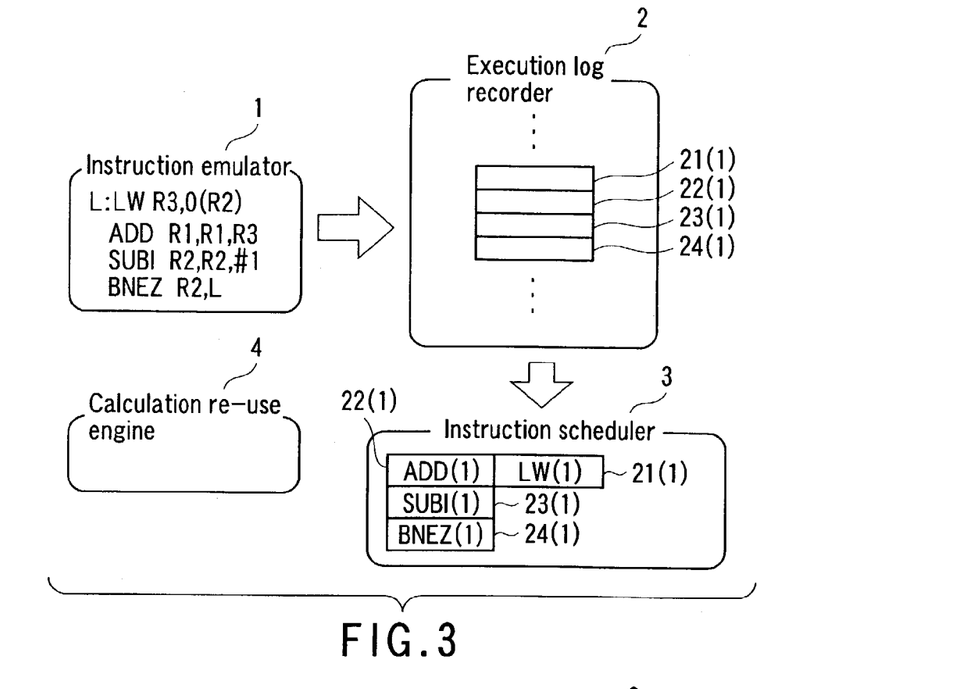
FIG. 3 is a functional block diagram showing a state wherein two new instructions are further sent to the instruction scheduler after the state shown in FIG. 2.

The instruction emulator 1 fetches the next branch instruction BNEZ(1). The process associated with this branch instruction BNEZ(1) advances to steps S2, S3, S4, and S5 in the same manner as the subtract instruction SUBI(1). However, when an execution log 24(1) of the precedent execution result of this branch instruction BNEZ(1) is recorded in the execution log recorder 2, as shown in FIG. 3, if the branch instruction BNEZ(1) is a backward branch instruction, YES is determined in turn in step S5, and the flow advances to step S6.

Note that the branch instruction "BNEZ R2,L" shown as an example in the instruction emulator 2 in FIG. 2 is a conditional branch instruction, and its meaning is to jump to the address of label L, i.e., a load instruction LW if the value of register R2 is not zero; otherwise, to execute a subsequent instruction.

In step S6, the precedent execution result of the immediately preceding backward branch instruction is compared with that of the current branch instruction to check if the branch instruction address and branch destination address of these two instructions match.

For example, if the first backward branch instruction is fetched, this branch instruction is executed precedently, the address (e.g., A) and branch destination address (e.g., B) of this branch instruction are recorded in an execution log. Also, the recording position (e.g., C) of that execution log in the execution log recorder 2 is recorded in, e.g., the instruction emulator 1. After that, when the second backward branch instruction is fetched, addresses obtained as a result of precedent execution of this second branch instruction are compared with addresses A and B stored at position C.

However, in this case, since the fetched branch instruction is the first one, and no record of a preceding branch instruction is available, NO is determined in step S6. Hence, the address of BNEZ(1) and branch destination address are recorded in an execution log 24(1), and the recording position of the execution log 24(1) is stored at C described above. After that, the flow advances to step S11.

In this state, since the execution logs 23(1) and 24(1) associated with the subtract instruction SUBI(1) and branch instruction BNEZ(1) which form a scheduling target instruction sequence for one cycle are stored in the execution log recorder 2, these instructions are transferred to the instruction scheduler 3 to execute scheduling. FIG. 3 shows the contents of the instruction scheduler 3 at that time.

The state shown in FIG. 3 indicates the scheduling result of the execution logs 23(1) and 24(1) of the subtract instruction SUBI(1) and branch instruction BNEZ(1) in the instruction scheduler 3. After this scheduling is executed, the flow returns to step S2.

In step S2, the instruction emulator 1 fetches and executes a load instruction LW(2), and then fetches and executes an add instruction ADD(2). The processes associated with the load instruction LW(2) and add instruction ADD(2) are the same as those of the load instruction LW(1) and add instruction ADD(1) described above. That is, since the process associated with the load instruction LW(2) advances to steps S2, S3, S4, S5, and S10 in turn, and that associated with the add instruction ADD(2) advances to steps S2, S3, S4, S5, S10, and S11, a description thereof will be omitted.

Figure 4:
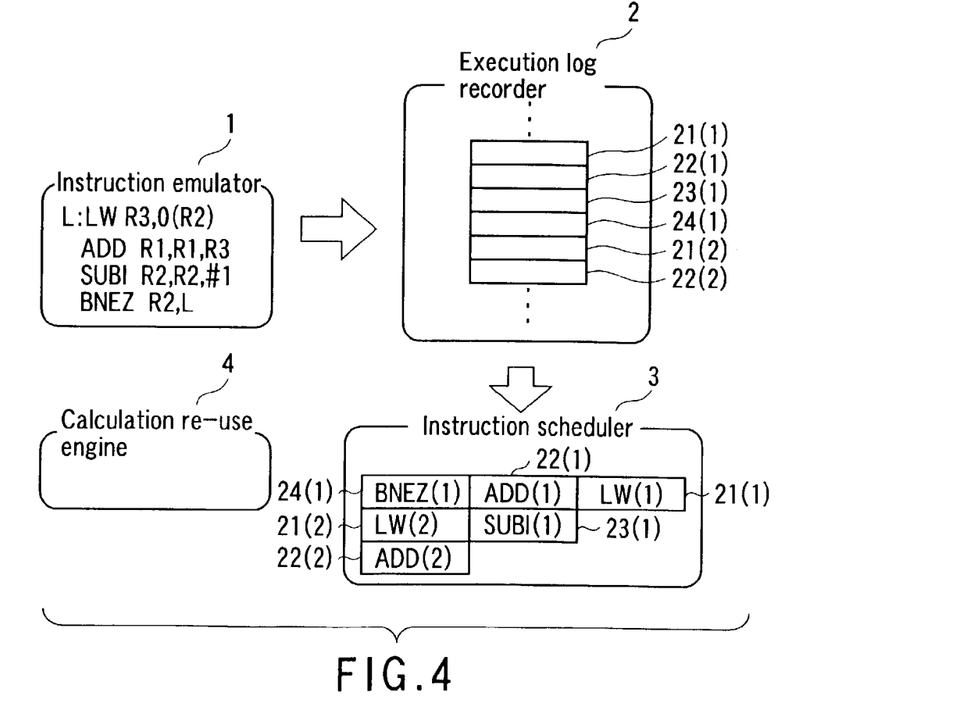
FIG. 4 is a functional block diagram showing a state wherein two new instructions are further sent to the instruction scheduler after the state shown in FIG. 3.

FIG. 4 shows a state wherein execution logs 21(2) and 22(2) of two instructions, i.e., the load instruction LW(2) and add instruction ADD(2) are sent from the execution log recorder 2 to the instruction scheduler 3, and are scheduled. As a result, the flow returns to step S2.

In step S2, the instruction emulator 1 fetches a new subtract instruction SUBI(2). The process associated with this subtract instruction SUBI(2) advances to steps S2, S3, S4, S5, and S10, and then returns to step S2. As a result, an execution log 23(2) of the subtract instruction SUBI(2) is recorded in the recorder 2.

Figure 5:
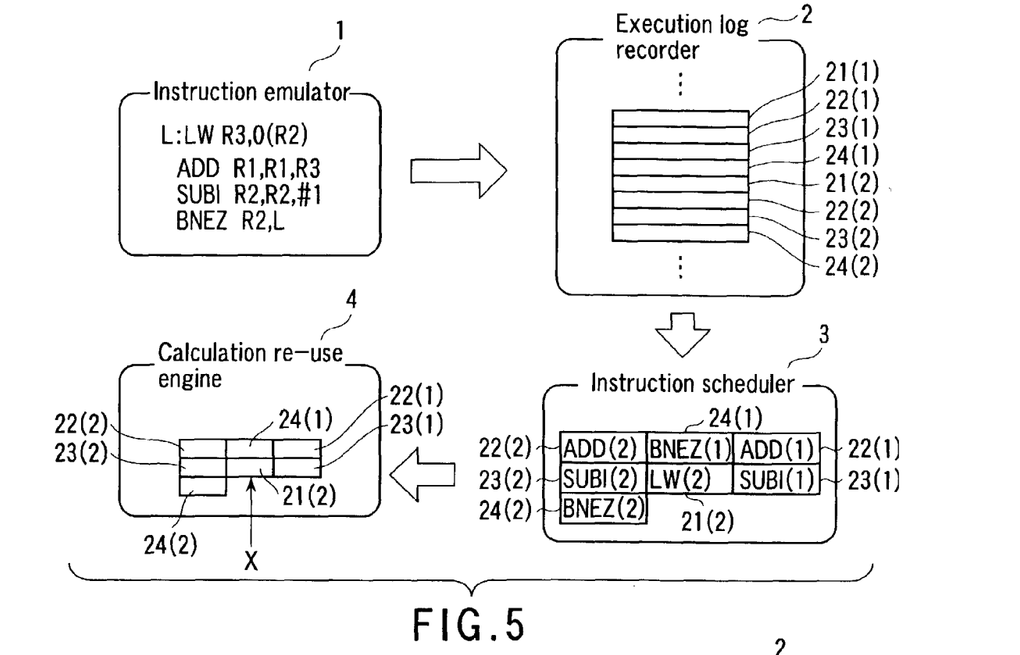
FIG. 5 is a functional block diagram showing a state wherein two new instructions are further sent to the instruction scheduler after FIG. 4, a loop is detected, and the contents of the instruction scheduler at that time are registered in a calculation re-use engine.

In this state, the instruction emulator fetches and executes a branch instruction BNEZ(2) as the next instruction in step S2. The process associated with this branch instruction BNEZ (2) advances to steps S2, S3, S4, S5, and S6. At this time, an execution log 24(2) associated with the second branch instruction BNEZ(2) precendently executed by the instruction emulator 1 is recorded in the execution log recorder 2, as shown in FIG. 5, and is sent to the first pipeline stage of the instruction scheduler 3. In this case, since the check result of a backward branch instruction is YES in step S5, the flow advances to step S6.

In step S6, since the branch instruction address and branch destination address in the execution log 24(1) of the immediately preceding, i.e., first backward branch instruction BNEZ(1) recorded at the recording position C of the recorder 2 match those of the execution log 24(2) of the current, second branch instruction BENZ(2), YES is determined in step S6, i.e., a loop is detected, and the flow advances to step S7. In step S7, the loop detection mode is set to TRUE (logical value).

In the set loop detection mode, every time the instruction emulator 1 executes a newly fetched instruction, the execution result of that instruction is compared with the contents of the execution logs as the execution results of preceding instructions recorded after the recording position C of the execution log recorder 2 to check if they match. A loop is formed while this match is detected. A detailed description of this process will be described later in step S12.

As described above, in step S7 of the process associated with the second branch instruction BNEZ(2), the loop detection mode is set to TRUE (logical value). At this time, the instruction emulator 1 records a position next to the recording position C of the execution log 24(1) of the preceding branch instruction BNEZ(1), i.e., the recording position of the execution log 21(2) of the load instruction LW(2) as the execution log recording position (e.g., D) to be looked up to compare the execution logs. The recording position C of the execution log is updated to that of the execution log 24(2) of the current branch instruction BNEZ(2).

In step S8, the execution logs 23(2) and 24(2) of the subtract instruction SUBI(2) and branch instruction BNEZ(2), which form a scheduling target instruction sequence for one cycle, are transferred from the execution log recorder 2 to the instruction scheduler 3, as shown in FIG. 5, thus executing scheduling.

After that, the instruction sequence held as a scheduling target in the three pipeline stages of the instruction scheduler 3 is stored and registered as a snapshot in the calculation re-use engine 4 in step S9. Note that X represents the instruction sequence registered at that time, as shown in FIG. 5. Also, the scheduling contents of the instruction scheduler 3 are also saved in the calculation re-use engine 4. When the contents of the instruction scheduler 3 are registered as A in the calculation re-use engine 4, the flow returns to step S2.

The instruction emulator 1 fetches and executes an instruction LW(3). After that, the flow advances to steps S2 and S3. In this case, since the control has already entered the loop detection mode, the flow advances from step S3 to step S12. It is checked in step S12 if the execution result of the executed instruction matches that of the preceding instruction in the immediately preceding loop recorded at the recording position D of the execution log.

In this case, since the execution result of the latest instruction matches the contents of the execution log 21(2) of LW(2) as the preceding instruction recorded at the recording position D of the execution log, YES is determined in step S12, and the flow advances to step S18. In step S18, the execution result of the fetched and executed instruction is recorded in the execution log recorder 2, and the execution log recording position D to be looked up is incremented by 1. After that, the flow advances to step S19.

Figure 6:
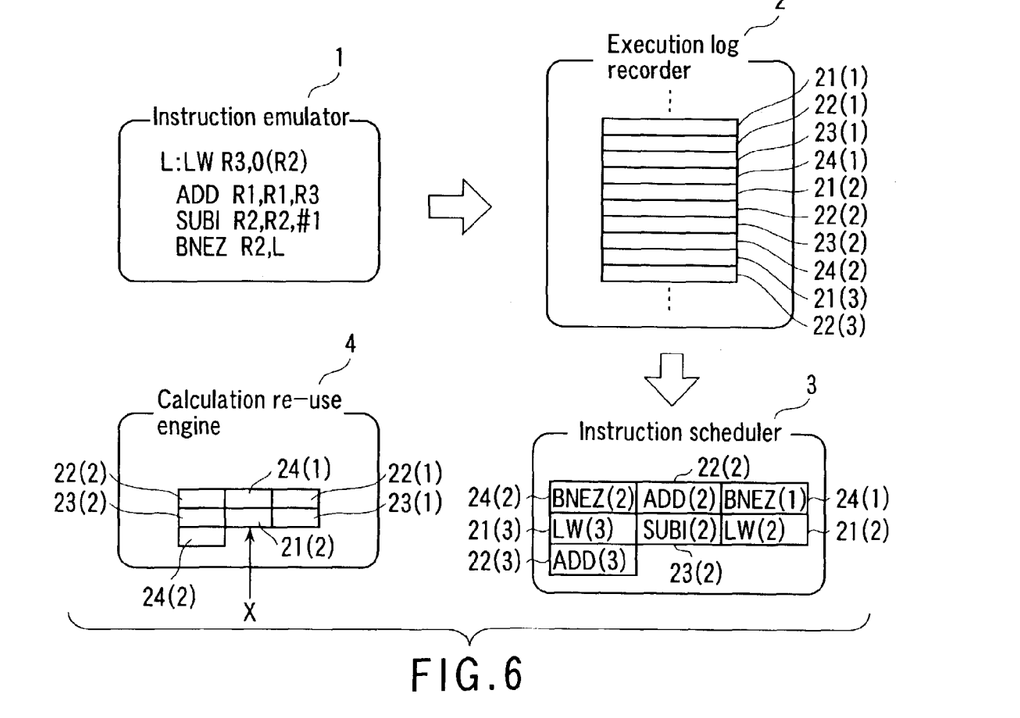
FIG. 6 is a functional block diagram showing a state wherein two new instructions are further sent to the instruction scheduler after FIG. 5.

It is checked in step S19 if the high-speed execution mode is TRUE. Since it is determined in step S19 that the high-speed execution mode is FALSE when this load instruction LW(3) is fetched, the flow advances to step S20. The precedent execution result associated with this load instruction LW(3) is recorded in the recorder 2 as an execution log 21(3), and is supplied to the first pipeline stage of the instruction scheduler 3, as shown in FIG. 6.

It is checked in step S20 if the instruction of this execution log 21(3) is a backward branch instruction. Since this load instruction LW(3) is not a backward branch instruction, NO is determined in step S20, and the flow returns to step S10.

At this stage of step S10, since the execution log does not store a scheduling target instruction sequence for one cycle yet, the flow returns to step S2.

The instruction emulator 1 fetches and executes the next add instruction ADD(3). After that, since the process associated with this add instruction ADD(3) advances in turn to steps S2, S3, S12, S18, S19, S20, and S10, a description thereof will be omitted.

In step S10, as a result of recording of an execution log 22(3) of the execution result associated with the add instruction ADD(3) in the execution log recorder 2, since a scheduling target instruction sequence for one cycle is stored, the flow advances from step S10 to step S11. In step S11, the scheduling target instruction sequence for one cycle is transferred from the execution log recorder 2 to the instruction scheduler 3, thus executing scheduling.

FIG. 6 shows the scheduling result of the load instruction LW(3) and add instruction ADD(3) in the instruction scheduler 3. After this scheduling is executed, the flow returns to step S2.

The instruction emulator 1 fetches and executes a subtract instruction SUBI(3). After that, since the process associated with this subtract instruction SUBI(3) is the same as that of the load instruction LW(3), i.e., advances in turn to steps S2, S3, S12, S18, S19, S20, and S10, a description thereof will be omitted.

In step S10 at that time, since the execution log recorder 2 does not store a scheduling target instruction sequence for one cycle yet, the flow returns to step S2. Then, the instruction emulator 1 fetches and executes a new branch instruction BNEZ(3). After that, the process associated with this branch instruction BNEZ(3) advances in turn to steps S2, S3, S12, S18, S19, and S20.

Since this branch instruction BNEZ(3) is a backward branch instruction, the flow advances from step S20 to step S21 at this time. In this case, the execution log recording position C is updated to the recording position of an execution log 24(3) of the current branch instruction BNEZ(3). In step S21, the execution logs of the scheduling target instruction sequence for the next cycle, which includes the execution log 24(3), are transferred from the execution log recorder 2 to the instruction scheduler 3, thus executing scheduling. After that, the flow advances to step S22.

It is checked in step S22 if the contents of the instruction sequence to be scheduled by the instruction scheduler 3 have already been registered in the calculation re-use engine 4. Since the state wherein the subtract instruction SUBI(3) and branch instruction BNEZ(3) are supplied to the instruction scheduler 3 matches the registered instruction sequence X in FIG. 5, which has already been registered in the calculation re-use engine 4, the flow advances to step S24.

In step S24, the high-speed execution mode is set to TRUE. Since the registered instruction sequence X has already been registered in the calculation re-use engine 4, and is re-used, the already registered instruction sequence X is set as a re-use state. Also, this re-use state is set as a state next to the previously registered state. Since the previously registered state is also the instruction sequence X, the state next to X is X. After that, the flow returns to step S2.

Figure 7:
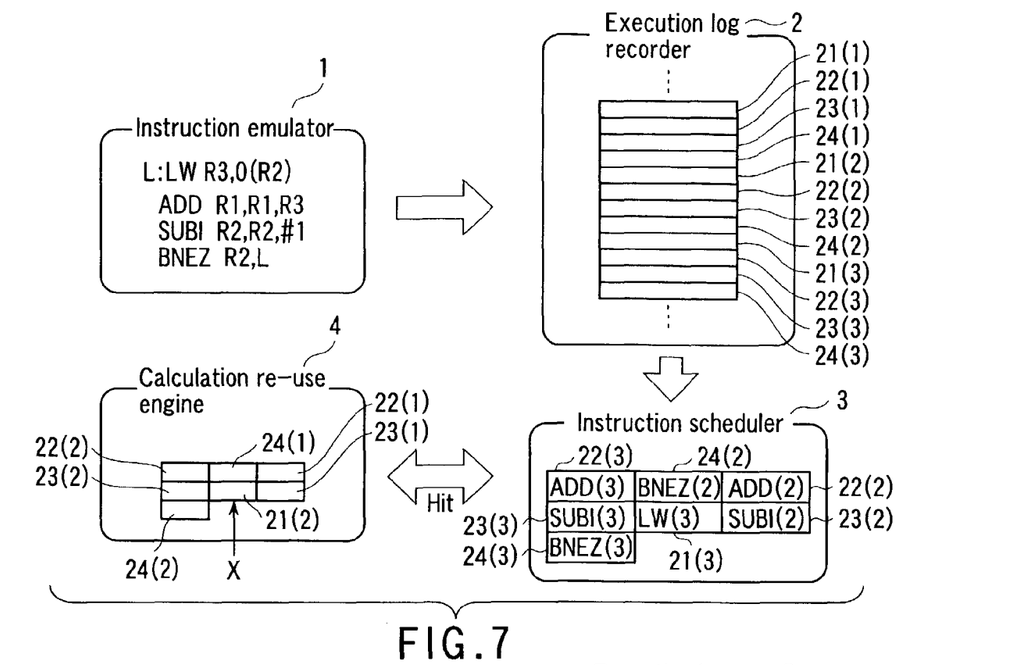
FIG. 7 is a functional block diagram showing a state wherein two new instructions are further sent to the instruction scheduler after FIG. 6, and the contents of the instruction scheduler at that time match the already registered contents of the calculation re-use engine in a loop detection mode.

FIG. 7 shows a state wherein the execution logs 23(3) and 24(3) of the subtract instruction SUBI(3) and branch instruction BNEZ(3) are supplied to and held by the instruction scheduler 3.

As shown in FIG. 7, since the instruction holding state of the instruction scheduler 3 which receives the subtract instruction SUBI(3) and branch instruction BNEZ(3) matches that which was sent to the calculation re-use engine 4 when the subtract instruction SUBI(2) and branch instruction BNEZ(2) one loop before were scheduled by the instruction scheduler 3, the scheduling calculation result one loop before can be re-used. That is, since the same scheduling process need not be repeated until the loop comes to an end, the scheduling process is skipped, and the first scheduling result is used as needed.

In this case, the instruction sequence holding state of the instruction scheduler 3 matches the previously registered instruction sequence A in the calculation re-use engine 4, but they may not match in some cases. In such case, another registered instruction sequence (e.g., B) is newly registered in the calculation re-use engine 4 in addition to the registered instruction sequence A, which has already been registered in the calculation re-use engine 4. Therefore, when an instruction sequence is supplied to the instruction scheduler 3 while the loop is detected, it is compared with a plurality of contents that have already been registered in the calculation re-use engine 4. As a result, if the current instruction sequence matches one of these contents, the instruction sequence supplied to the instruction scheduler 3 at that time need not undergo schedule arithmetic operations, and high-speed scheduling in the high-speed execution mode can be achieved.

In step S2, the instruction emulator 1 fetches and executes a load instruction LW(4). After that, since the process associated with this load instruction LW(4) advances in turn to steps S2, S3, S12, S18, and S19 as in the load instruction LW(3), a description thereof will be omitted.

Since it is determined in step S19 that the high-speed execution mode has already been set at this time, the flow advances to step S25. It is checked in step S25 if this instruction is a backward branch instruction. Since the load instruction LW(4) is not a backward branch instruction, the flow returns to step S2.

After that, the instruction emulator 1 sequentially fetches and executes an add instruction ADD(4), subtract instruction SUBI(4), and branch instruction BNEZ(4). Since the processes associated with these add instruction ADD(4), subtract instruction SUBI(4), and branch instruction BNEZ(4) are the same as that of the load instruction LW(4), and advance in turn to steps S2, S3, S12, S18, S19, and S25, a description thereof will be omitted.

If the branch instruction BNEZ(4) is fetched, YES is determined in step S25, and the execution log recording position C is updated to the recording position of an execution log 24(4) of the current branch instruction BNEZ(4). The flow then advances to step S26. In step S26, the instruction sequence set as the re-use state is replaced by its next state. In this case, since the source re-use state is the instruction sequence X and the next state is also the instruction sequence X, the re-use state consequently remains unchanged.

Figure 8:
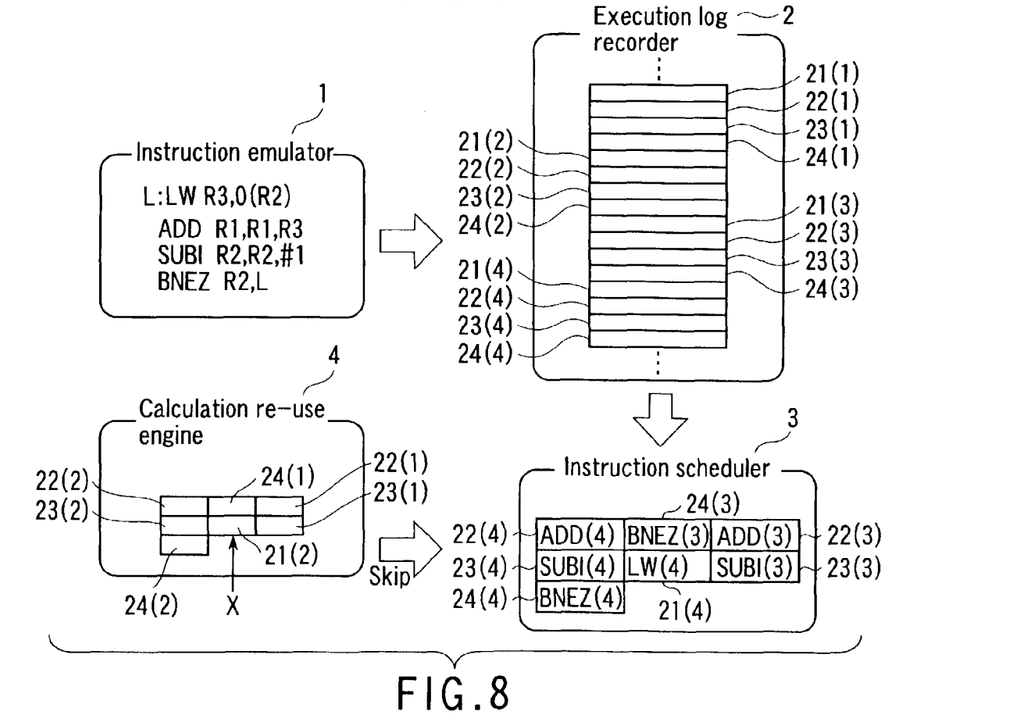
FIG. 8 is a functional block diagram showing a state wherein an instruction scheduling process is skipped using the contents stored in the calculation re-use engine when two new instructions are further sent to the instruction scheduler after FIG. 7.

FIG. 8 shows a state wherein the state of the instruction scheduler is set by the instruction sequence X in the re-use state, and the execution logs 23(4) and 24(4) of two instructions, i.e., the subtract instruction SUBI(4) and branch instruction BNEZ(4), are supplied to the instruction scheduler 3.

Figure 9:
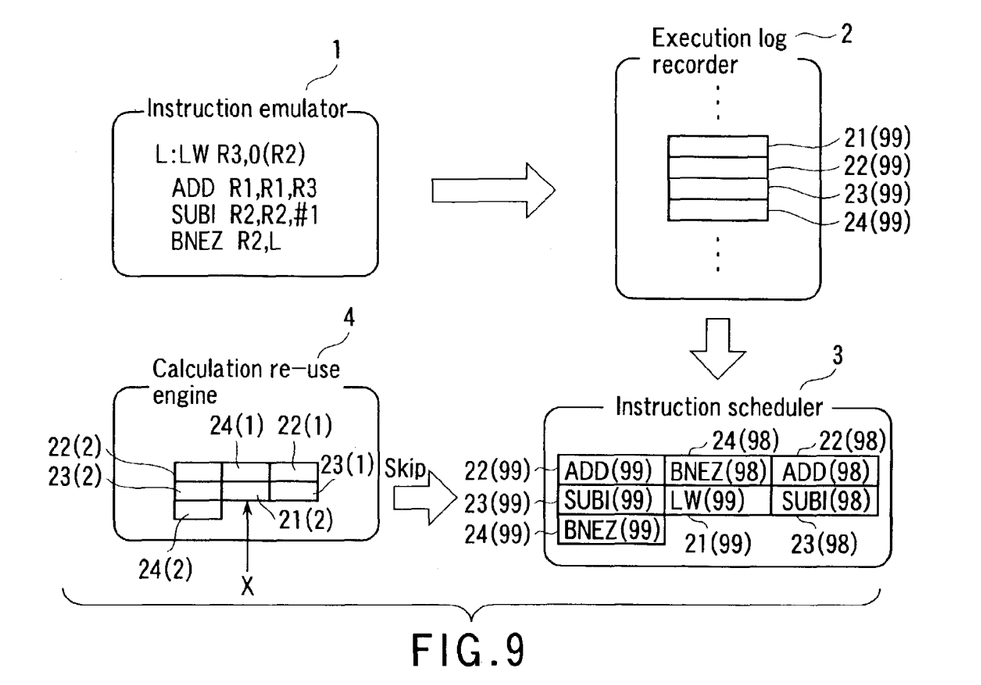
FIG. 9 is a functional block diagram showing a state wherein two new instructions are further sent to the instruction scheduler after FIG. 8, the instruction scheduling process is skipped using the contents stored in the calculation re-use engine, and the loop then ends.

Subsequently, since the same scheduling result is repetitively generated as long as the loop continues, the instruction scheduling process in the instruction scheduler 3 is skipped using the registered data stored in the calculation re-use engine 4 until the loop ends. For example, assuming that the loop comes to an end after the 100th loop cycle, the process up to a load instruction LW(99), add instruction ADD(99), subtract instruction SUBI(99), and branch instruction BNEZ(99) of an instruction sequence as the 99th repetition of the loop is the same as that of the instruction sequence LW(4), ADD(4), SUBI(4), and BNEZ(4), and can re-use the registered contents in the calculation re-use engine 4. Hence, all instruction scheduling processes during the loop are skipped. FIG. 9 shows the state of the CA simulator at that time.

Figure 10:
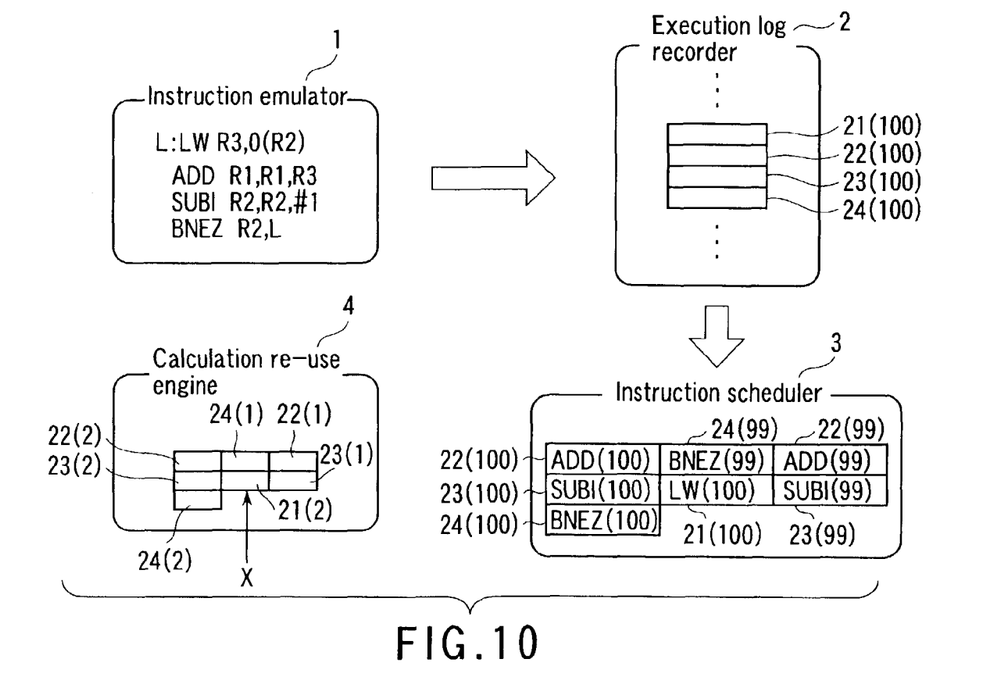
FIG. 10 is a functional block diagram showing a state wherein the skip operation of the instruction scheduling process ends at the end of the loop while two new instructions are further sent to the instruction scheduler after FIG. 9.

FIG. 10 shows the state of the CA simulator in the 100th loop cycle. In step S2, the instruction emulator 1 fetches and executes a load instruction LW(100). The process associated with this load instruction LW(100) is the same as the previous load instruction LW(4), and advances to steps S2, S3, S12, S18, S19, and S25. Also, since the processes associated with an add instruction ADD(100) and subtract instruction SUBI (100) are the same as those of the previous add instruction ADD(4) and subtract instruction SUBI(4), a description thereof will be omitted.

After that, the instruction emulator 1 fetches and executes a branch instruction BNEZ(100) in step S2. In this process, since the loop detection mode is still TRUE, the flow advances from step S3 to step S12. At this time, since the branch instruction BNEZ(100) is the last one of a series of loop instructions, its execution result, i.e., the branch destination address and the like do not match the contents at the execution log recording position in the previous loop, and the flow advances to step S13 in turn.

In step S13, the loop detection mode is set to FALSE at this time. The flow then advances to step S14 to check if the high-speed execution mode is TRUE. In this process, since the high-speed execution mode is still TRUE, the flow advances to step S15.

In step S15, the high-speed execution mode is set to FALSE. In this case, an execution log 24(100) of the branch instruction BNEZ(100) is recorded in the execution log recorder 2, as shown in FIG. 10. After that, the process returns to the recording position of an execution log 21(100) of LW(100) as a position next to the recording position of an execution log next to the immediately preceding backward branch instruction, i.e., the recording position C of an execution log 24(99) of BNEZ(99). At this time, the instruction scheduler still has the state shown in FIG. 9.

As a result, the flow advances to step S16 to send the execution logs 21(100) and 22(100) of a scheduling target instruction sequence LW(100) and ADD(100) for one cycle from the execution log recorder to the instruction scheduler 3, thus executing scheduling.

The flow then advances to step S17 to check if execution logs to be scheduled, which have already been registered in the execution log recorder 2, still remain in the current loop. In this case, since the execution logs still, the flow returns to step S16.

In this state, in step S16 execution logs 23(100) and 24(100) of the subtraction instruction SUBI(100) and branch instruction BNEZ(100) as a scheduling target instruction sequence for one cycle are sent from the execution log recorder 2 to the instruction scheduler 3, thus executing scheduling, as shown in FIG. 10. Since the loop count is assumed to be 100, execution logs of loop repetition come to an end in this state. Hence, the checking result in step S17 becomes NO in this case, and the flow returns to step S2.

In this manner, the loop process ends, and the instruction emulator 1 fetches and precedently executes the next new instruction next1. The flow then advances to step S3. At this time, since no new loop is detected yet, the loop detection mode is FALSE, and the execution result of the new instruction next1 is recorded in the execution log recorder 2 in step S4.

It is checked in step S5 if the current instruction is a backward branch instruction. If this instruction next1 is not a backward branch instruction, the flow advances to step S10. When an execution log 25 of the instruction next1 is stored in the execution log recorder 2, as shown in FIG. 11, since a scheduling target instruction sequence for one cycle is not stored yet, no scheduling is executed. Hence, the flow returns to step S2.

The instruction emulator 1 fetches and executes the next instruction next2. The process associated with this instruction next2 advances in turn to steps S2, S3, S4, S5, and S10. At this time, since the execution logs 25 and 26 of the scheduling target instruction sequence next1 and next2 for one cycle are stored, the flow advances to step S11. Then, the execution logs 25 and 26 of the scheduling target instruction sequence for one cycle are supplied from the execution log recorder 2 to the instruction scheduler 3, thus executing scheduling.

After that, the aforementioned operations are repeated as long as instructions to be scheduled remain stored in the main storage.

Note that the above description does not cover all processes shown in the flow charts. For example, the flow may return from step S14 to step S4. That is, before the process for one loop is completed, the execution result of a new instruction fetched by the instruction emulator 1 does not often match the contents of the execution log for some cause in step S12. In this case, since NO is determined in step S12, loop detection mode=FALSE is set in step S13, and also, high-speed execution mode=FALSE. In such case, the flow returns from step S14 to step S4 to detect another loop.

Also, the flow may advance from step S22 to step S23. For example, if the already registered instruction sequence is X, and an instruction sequence in the scheduler 3 to be compared with that instruction sequence is also X, the high-speed execution mode is set to TRUE in step S24. In addition, this instruction sequence X is set in a re-use state, and an instruction sequence in a state next to this re-use state is X.

However, an instruction sequence in a state next to this re-use state may have another state, e.g., may be an instruction sequence Y, in some cases. For example, if an instruction sequence registered in step S9 is X, and an instruction sequence to be compared to this sequence in step S22 is a different instruction sequence Y, the flow advances from step S22 to step S23. In this case, since an instruction sequence B is registered in step S23, this instruction sequence B is set as the next state of the previously registered instruction sequence X of the scheduler 3 in step S23.

In this state, since the instruction sequence to be compared in the next loop cycle is X, the flow advances from step S22 to step S24, and the instruction sequence X is set as a re-use state. As a result, this instruction sequence X becomes a state next to the previously registered state Y.

Since the high-speed execution mode is set in step S24, the flow advances from step S19 to step S26 via step S25 in the next loop cycle. In this cycle, since the instruction sequence Y is re-used, the re-use instruction sequence in the next loop cycle becomes X, and the instruction sequence X is re-used in turn in the second next loop cycle. In this way, the instruction sequences X and Y are alternately re-used for respective loop cycles in step S26.

Using the CA simulator with this arrangement, the calculation time required for instruction scheduling can be greatly reduced. Especially, CAS of calculations including many loops, i.e., including a large number of instructions to be repeated per loop, can be remarkably speeded up.

In the above description, the recording capacity of execution logs in the execution log recorder 2 is not particularly specified. Normally, the capacity that can store precedent execution logs for 10,000 instructions suffices to practical simulation. In this case, before execution logs for 10,000 instructions are recorded, formed execution logs are sequentially stored in the execution log recorder 2. When the execution result of the 10,001st instruction is sent to the execution log recorder 2, the first execution log which has been stored first is erased, and that of the 10,001st instruction is recorded instead at that position. With such setup, when only logs in a given quantity (e.g., for 10,000 instructions) are saved, and an execution log of an old instruction before these instructions is discarded every time an execution log of the latest instruction is formed, the recording capacity of the log recorder can have a practical size. In this case, one loop size must fall within the recording capacity of the log recorder, but such requirement can be met by the capacity for 10,000 instructions. However, the execution log recording capacity can be further increased or decreased depending on the contents of a loop contained in a developed program to be simulated.

Using the CA simulator with this arrangement, the calculation time required for instruction scheduling can be greatly reduced. Especially, simulation of a program including many loops, and a large number of instructions to be repeated per loop, can be remarkably speeded up. Hence, the scheduling processing time of the instruction scheduler that requires a long calculation time can be greatly reduced.

As described above, since the contents of the instruction scheduler are registered in the calculation re-use engine, the instruction scheduler compares the state of the instruction scheduler that receives an execution log, and that of the calculation re-use engine in which the state of the instruction scheduler was previously registered, upon detection of a loop. If the state of the instruction scheduler matches the registered state of the calculation re-use engine, the instruction scheduler can skip scheduling, thus shortening the scheduling processing time. Especially, if a target instruction sequence includes many loops, performance evaluation and operation inspection of a system including an SOC can be accurately executed without scheduling the loop part.

As described in detail above, according to the present invention, a simulation method and simulation system of instruction scheduling, which can greatly shorten the instruction scheduling processing time, and allow high-speed, highly accurate simulation upon making performance evaluation and operation inspection of software of a developed information processing system can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A simulation method for simulating an operation of a processor (CPU) using a cycle accurate (CA) simulator comprising an instruction emulator for fetching and executing target instructions of a program sequence, an execution log recorder that records results of the executed target instructions, an instruction scheduler for scheduling the executed instructions, and a calculation re-use engine to obtain performance evaluation and operation inspection of the processor, the method comprising:
    fetching a sequence of target instructions including a loop;
    emulating the execution of the target instructions for obtaining an actual execution result of the target instructions;
    recording the actual execution results of the executed target instructions in the execution log recorder;
    scheduling the target instructions based on the recorded actual execution results;
    detecting the loop in the target instructions based on the execution results recorded in the execution log recorder;
    registering the instructions of the loop and their scheduling with the calculation re-use engine if the instructions are not already registered; and
    determining if a sequence of instructions in the instruction scheduler is registered with the re-use engine and if so, re-using the registered scheduling for the sequence of instructions of the loop for a subsequent cycle of the loop.

2. A method according to claim 1, wherein the target instruction sequence contains at least first and second backward branch instructions, which are fetched in turn, and the loop is detected in the instruction scheduler by detecting matches between branch instruction addresses and branch destination addresses of the first and second backward branch instructions.

3. A method according to claim 2, wherein the execution log is part of one or more execution logs that are stored in a given quantity as an instruction sequence to be scheduled, and when the execution logs exceed the given quantity, the stored execution logs are erased in turn from the oldest execution log to be rewritten by the latest execution log.

4. A method according to claim 3, wherein instruction scheduling is executed on the basis of the execution log, and an instruction scheduling result is stored.

5. A method according to claim 2, wherein instruction scheduling is executed on the basis of the execution log, and an instruction scheduling result is stored.

6. A method according to claim 1, wherein the execution log is part of one or more execution logs that are stored in a given quantity as an instruction sequence to be scheduled, and when the execution logs exceed the given quantity, the stored execution logs are erased in turn from the oldest execution log to be rewritten by the latest execution log.

7. A method according to claim 6, wherein instruction scheduling is executed on the basis of the execution log, and an instruction scheduling result is stored.

8. A method according to claim 1, wherein instruction scheduling is executed on the basis of the execution log, and an instruction scheduling result is stored.

* * * * *